(12) United States Patent
King

(10) Patent No.: US 10,093,156 B1
(45) Date of Patent: Oct. 9, 2018

(54) PROTECTIVE FILM FOR VEHICLE WINDOW

(71) Applicant: Harry King, Hoboken, NJ (US)

(72) Inventor: Harry King, Hoboken, NJ (US)

( * ) Notice: Subject to any disclaimer, the term of this patent is extended or adjusted under 35 U.S.C. 154(b) by 71 days.

(21) Appl. No.: 15/284,661

(22) Filed: Oct. 4, 2016

(51) Int. Cl.
B60J 1/20 (2006.01)

(52) U.S. Cl.
CPC .................... B60J 1/2094 (2013.01)

(58) Field of Classification Search
CPC ........................................ B60J 1/2094
USPC ........................................... 296/95.1
See application file for complete search history.

(56) References Cited

U.S. PATENT DOCUMENTS

| | | | | |
|---|---|---|---|---|
| 3,544,196 A | * | 12/1970 | Robba | G02B 5/205 351/49 |
| 4,811,982 A | * | 3/1989 | Carlyle | B60J 11/08 296/95.1 |
| D443,572 S | | 6/2001 | Freeman | |
| 6,492,017 B1 | | 12/2002 | Bohm | |
| 6,634,695 B2 | | 10/2003 | McCormick | |
| 6,777,055 B2 | * | 8/2004 | Janssen | B32B 7/06 428/41.8 |
| 8,438,765 B2 | * | 5/2013 | Sanders | B60R 19/50 40/200 |
| 2007/0077420 A1 | | 4/2007 | Worthen | |
| 2008/0190547 A1 | | 8/2008 | White | |
| 2008/0252095 A1 | | 10/2008 | Meyers | |
| 2009/0123739 A1 | | 5/2009 | Saitou | |

FOREIGN PATENT DOCUMENTS

FR 1213893 A 3/1994

* cited by examiner

Primary Examiner — Joseph Pape

(57) ABSTRACT

The protective film for vehicle window is a protective window film that is adapted for use with a vehicle. The protective film for vehicle window is adapted for use with the windshield of the vehicle. The protective film for vehicle window is applied to the windshield. The protective film for vehicle window is adapted to protect the windshield from damage by deflecting debris that falls upon the windshield during travel. The protective film for vehicle window is texturized. The protective film for vehicle window comprises a protective sheeting and an adhesive. The adhesive attaches the protective sheeting to the windshield.

10 Claims, 4 Drawing Sheets

PROTECTIVE FILM FOR VEHICLE WINDOW

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of layered products comprised of synthetic resins, more specifically, a first synthetic resin intended to be placed in a layer against a second layered substrate.

SUMMARY OF INVENTION

The protective film for vehicle window is a protective window film that is adapted for use with a vehicle. The protective film for vehicle window is adapted for use with the windshield of the vehicle. The protective film for vehicle window is applied to the windshield. The protective film for vehicle window is adapted to protect the windshield from damage by deflecting debris that falls upon the windshield during travel. The protective film for vehicle windows is texturized.

These together with additional objects, features and advantages of the protective film for vehicle window will be readily apparent to those of ordinary skill in the art upon reading the following detailed description of the presently preferred, but nonetheless illustrative, embodiments when taken in conjunction with the accompanying drawings.

In this respect, before explaining the current embodiments of the protective film for vehicle window in detail, it is to be understood that the protective film for vehicle window is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the protective film for vehicle window.

It is therefore important that the claims be regarded as including such equivalent construction insofar as they do not depart from the spirit and scope of the protective film for vehicle window. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
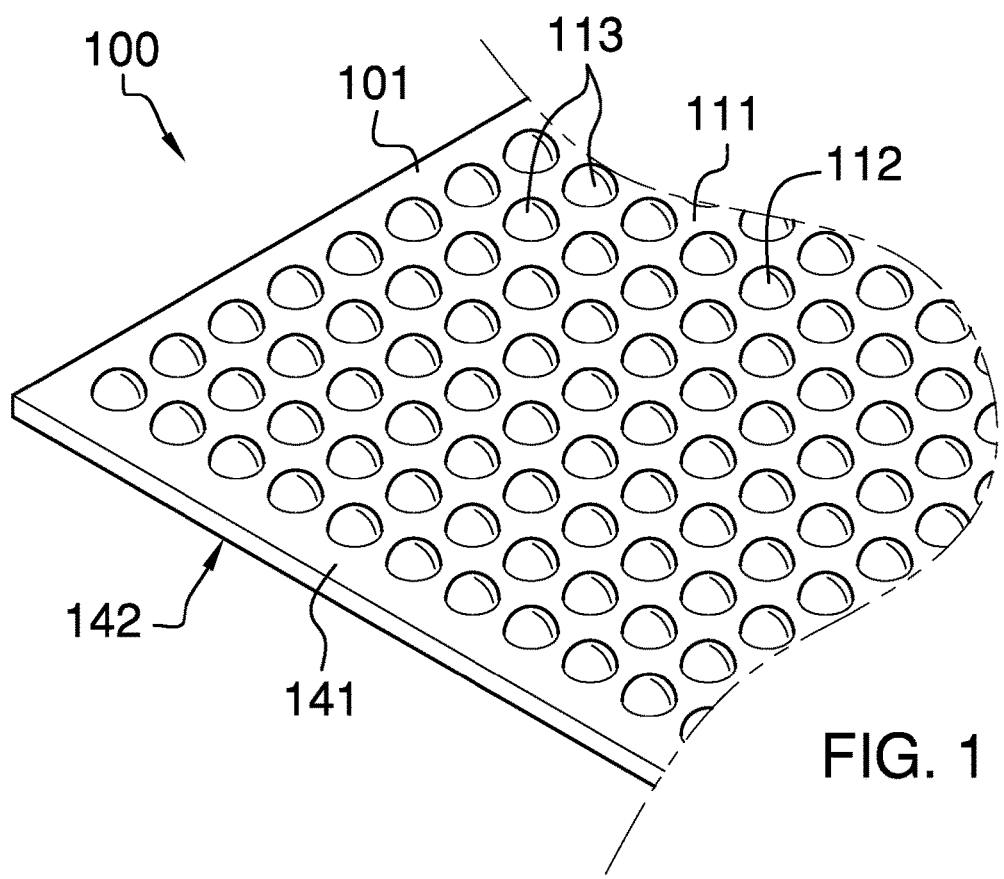
FIG. 1 is a perspective view of an embodiment of the disclosure.
Figure 2:
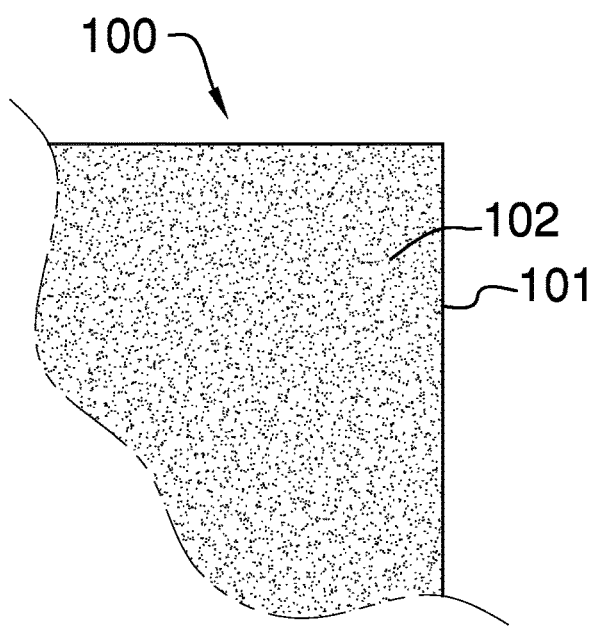
FIG. 2 is a bottom view of an embodiment of the disclosure.
Figure 3:
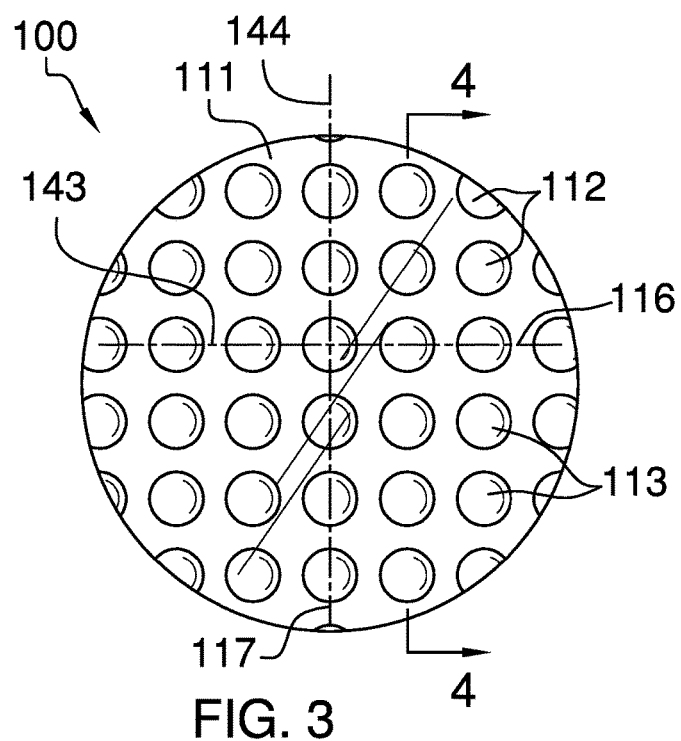
FIG. 3 is a top view of an embodiment of the disclosure.
Figure 4:
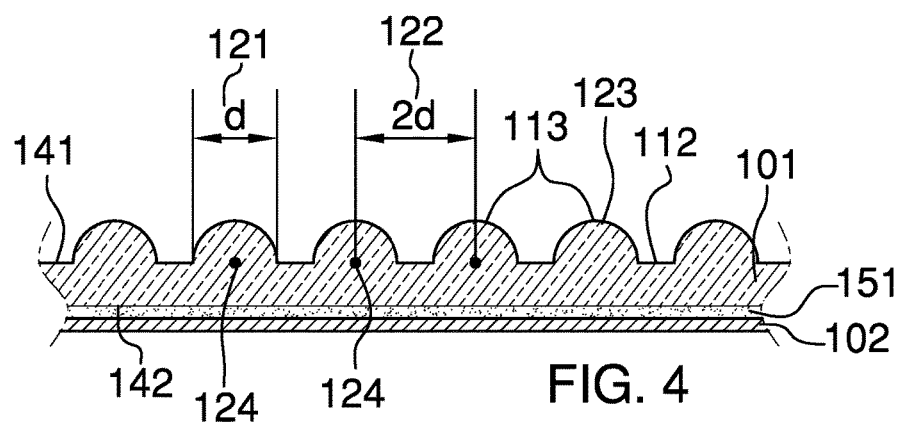
FIG. 4 is a cross-sectional view of an embodiment of the disclosure across 4-4 as shown in FIG. 3.
Figure 5:
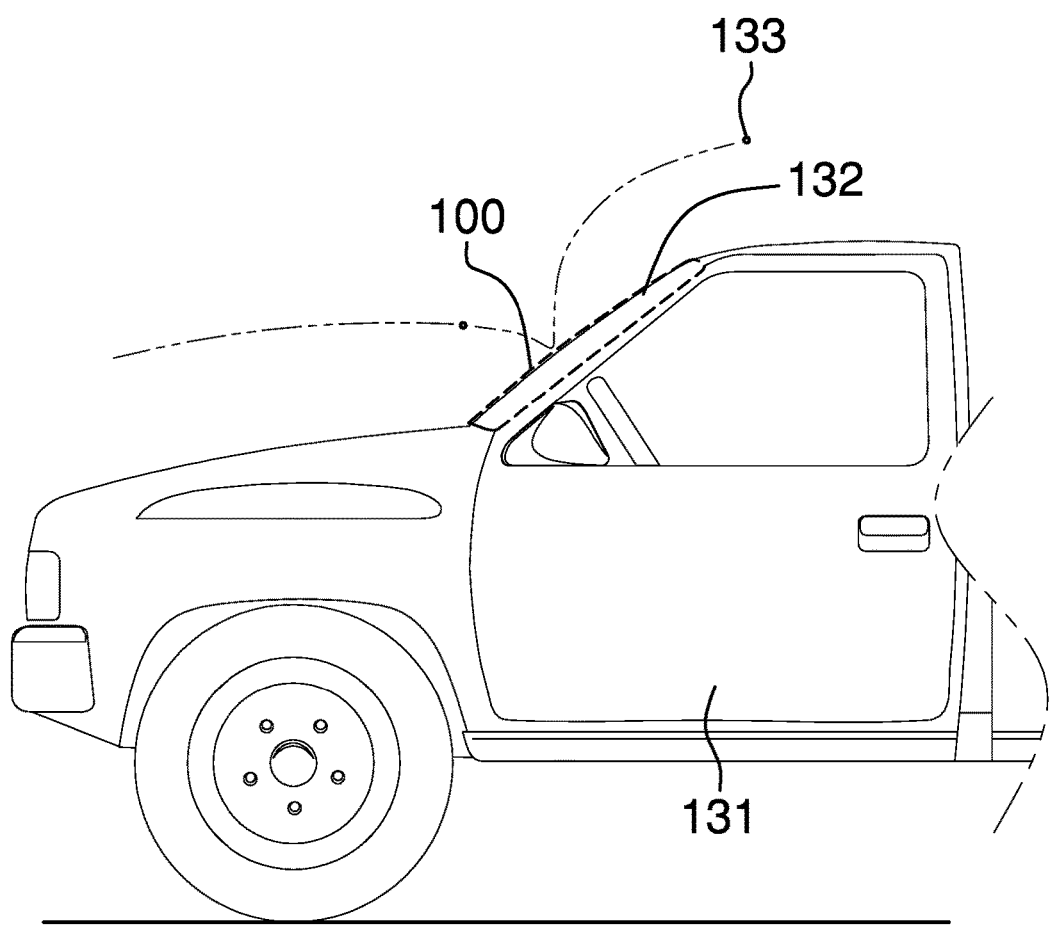
FIG. 5 is an in use view of an embodiment of the disclosure.
Figure 6:
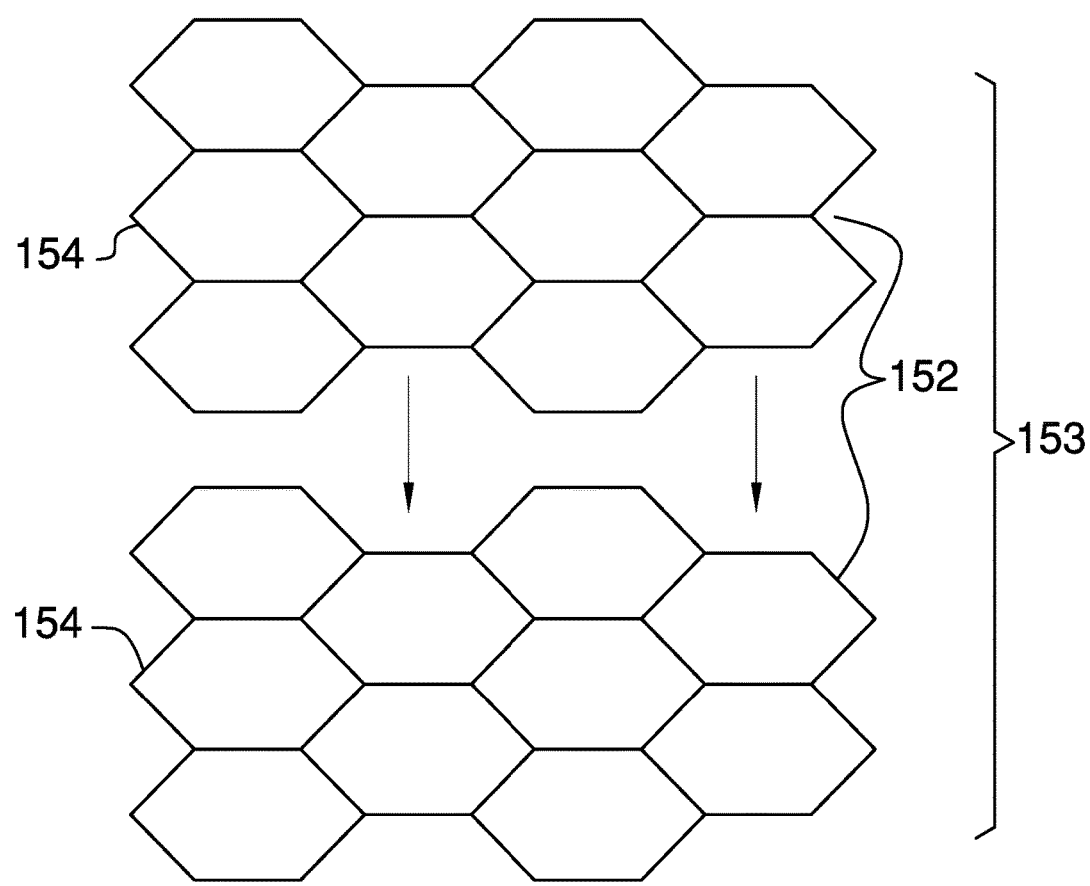
FIG. 6 is a detail view of an embodiment of the disclosure.

Detailed reference will now be made to one or more potential embodiments of the disclosure, which are illustrated in FIGS. 1 through 6.

The protective film for vehicle window 100 (hereinafter invention) comprises a protective sheeting 101 and an adhesive 102. The invention 100 is a protective window film that is adapted for use with a vehicle 131. The invention 100 is adapted for use with the vehicle 131 window 132. It shall be noted that the vehicle 131 window 132 may also be referred to as a windshield 132, and that the invention 100 is adapted to be used on any window of the vehicle 131, and not simply the windshield 132.

The invention 100 is applied to the vehicle 131 windshield 132. The invention 100 is adapted to protect the vehicle 131 windshield 132 from damage by deflecting road debris 133 that contacts the vehicle 131 windshield 132 during travel. The invention 100 is texturized. The adhesive 102 attaches the protective sheeting 101 to a vehicle 131 windshield 132.

The protective sheeting 101 comprises a film 111 and a textured surface 112. The film 111 is a plastic sheeting similar to the plastic sheeting used for window tinting of vehicles 131. The film 111 is further defined with a first surface 141 and a second surface 142. The film 111 is further formed with a textured surface 112. The textured surface 112 is applied to the first surface 141. In the first potential embodiment of the disclosure, the film 111 is formed from a polyimide. Methods to apply textured surfaces to window films are known and documented in the art and would be similar to the application of textured surfaces to window films commonly marketed for household uses under descriptions such as privacy films.

The textured surface 112 comprises a plurality of hemispherical projections 113. Each hemisphere selected from the plurality of hemispherical projections 113 is a hemispherical structure that is positioned on the first surface 141 such that the convex surface 123 of each selected hemisphere is viewed when the first surface 141 of the film 111 is directly viewed. Any hemisphere selected from the plurality of hemispherical projections 113 is identical to the hemispheres remaining within the plurality of hemispherical projections 113. Each hemisphere selected from the plurality of hemispherical projections 113 is defined with a diameter 121. Each hemisphere selected from the plurality of hemispherical projections 113 is assigned to a first sub-plurality of hemispherical projections 116. Each hemisphere selected from the plurality of hemispherical projections 113 is further assigned to a second sub-plurality of hemispherical projections 117. As shown most clearly in FIG. 3, each of the plurality of hemispherical projections 113 is arranged on the first surface 141 such that: 1) the spherical center 124 of each hemisphere lies on the first surface 141; 2) the spherical center 124 of any hemisphere selected from the first sub-plurality of hemispherical projections 116 lies on a first line 143 such that the first sub-plurality of hemispherical projections 116 forms a "row"; and, 3) the spherical center 124 of any hemisphere selected from the second sub-plurality of hemispherical projections 117 lies on a second line 144 such that the second sub-plurality of hemispherical projections 117 forms a "column." A first span spacing 122 between the spherical centers 124 of any two adjacent hemispheres selected from the first sub-plurality of hemispherical projections 116 are equal. A second span spacing 122 between the spherical centers 124 of any two adjacent hemispheres selected from the second sub-plurality of hemispherical projections 117 are equal. The first span spacing 122 and the second span spacing 122 are equal. The span spacing 122 equals twice the diameter 121 of any hemisphere selected from the plurality of hemispherical projections 113. The diameter 121 of any hemisphere selected from the plurality of hemispherical projections 113 is less than or equal to 0.1 mm.

The purpose of the textured surface 112 is to enhance the protection of the vehicle 131 windshield 132 by the invention 100 by enhancing the deflecting capabilities of the protective sheeting 101. Specifically, the plurality of hemispherical projections 113 provides a three dimensional textured surface 112 that through friction and the variation of surface angles across the textured surface 112 is better able, and more likely, to catch and deflect road debris 133 falling on the vehicle 131 windshield 132. The consistent and close span spacing 122 of each of the plurality of hemispherical projections 113 serves to minimize the visual distortion commonly observed when viewing through textured surfaces.

The protective sheeting 101 is attached to the exterior of the vehicle 131 windshield 132 using an adhesive 102. The application of the protective sheeting 101 using an adhesive 102 is similar to methods used in the application of window tinting films to vehicle 131 windows. Application methods and suitable adhesives for applying window films to vehicle 131 windows are well known and documented in the window tinting arts. In a first potential embodiment of the disclosure, a commercially available silicone based clear pressure sensitive adhesive 102 was used to attach the protective sheeting 101 to the vehicle 131 windshield 132. The use of a clear silicone pressure sensitive adhesive 102 is preferred when applying protective sheeting 101 to vehicle 131 windshields 132 or other windows formed with a curvature. In a second potential embodiment of the disclosure, the UV curable silicone based clear pressure sensitive adhesive 102 such that the curing of the adhesive 102 can be accelerated with ultraviolet lighting.

In a third potential embodiment of the disclosure, the protective sheeting 101 of the first potential embodiment of the disclosure further comprises a reinforced backing 151. The reinforced backing 151 is a transparent structure applied to the second surface 142 of the film 111. The purpose of the reinforced backing 151 is to strengthen the film 111 in order to minimize damage to the invention 100 from road debris 133. In the third potential embodiment of the disclosure, the reinforced backing 151 is formed from a plurality of graphene sheets 152. Each individual graphene sheet 154 selected from the plurality of graphene sheets 152 are layered against the individual graphene sheets 154 remaining in the plurality of graphene sheets 152 in order to form a transparent substrate 153 that is applied to the second surface 142 of the film 111. The transparency of each individual graphene sheet 154 is derived from the cyclic structure of an individual graphene sheet 154 as shown on FIG. 6. It is expected that 98% of visible light will pass through an individual graphene sheet 154 giving the individual graphene sheet 154 a transparent appearance. It is further expected that a transparent substrate comprising 10 individual graphene sheets 154 will continue to appear clear and transparent to the causal viewer.

Each individual graphene sheet 154 can be applied to the second surface 142 of the film 111 using lithographic or printing techniques. Specifically, the lithographic or printing techniques commonly used in install graphene sheets to capacitive touchscreens can be readily applied to lithographic or printing equipment commonly available for printing on films. The transparent substrate 153 formed from the plurality of graphene sheets 152 will be applied directly to the film 111 using this technique to form the reinforced backing 151.

A fourth potential embodiment of the disclosure, the first potential embodiment of the disclosure is further modified by applying a tinted pigment to the film 111 thus allowing the invention 100 to further provide the benefit of tinted windows to the vehicle 131.

A fifth potential embodiment further enhances the third potential embodiment of the disclosure by further increasing the number of individual graphene sheets 154 in the plurality of graphene sheets 152 that form the transparent substrate 153. In this instance scenario, the number of individual graphene sheets 154 is increased such that the protective sheeting 101 remains transparent but has a tinted appearance. It is expected that a transparent substrate 153 comprising 45 individual graphene sheets 154 will remain transparent and while providing a level of tinting that is legally acceptable in most jurisdictions.

To use the invention 100, the invention 100 is applied as a normal window tint film. Once the invention 100 is applied to a vehicle 131 windshield 132 no additional intervention is required.

The following definitions were used in this disclosure:

Adhesive: As used in this disclosure, an adhesive is a chemical substance that can be used to adhere two or more objects to each other. Types of adhesives include, but are not limited to, epoxies, polyurethanes, polyimides, or cyanoacrylates, silicone, or latex based adhesives.

Automobile: As used in this disclosure, an automobile is a road vehicle that that specializes in carrying passengers and light cargo loads. This definition is specifically intended to include vehicles generally referred to as pickup trucks, vans, and minivans.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Convex: As used in this disclosure, convex is used to describe: 1) a surface that resembles the outer surface of a sphere; or, 2) a surface with a curvature structure wherein a chord that connects any two points of the surface will pass through the described surface.

Diameter: As used in this disclosure, a diameter of an object is a straight line segment that passes through the center of an object. The line segment of the diameter is terminated at the perimeter or boundary of the object through which the line segment of the diameter runs.

Sheeting: As used in this disclosure, sheeting is a material, such as cloth or plastic, in the form of a thin flexible layer or layers.

Texture: As used in this disclosure, a texture refers to a tactile or three dimensional characteristic of a surface. In daily use, texture will on occasion refer to a visual characteristic of the surface.

Ultraviolet Light: As used in this disclosure, ultraviolet light is understood to be electromagnetic radiation with a wavelength lesser than visible light. In general usage, ultraviolet light is taken to mean electromagnetic radiation with a wavelength less than 400 nm.

UV: As used in this disclosure, UV is an abbreviation for ultraviolet.

Vehicle: As used in this disclosure, a vehicle is a motorized device that is used transporting carrying passengers, goods, or equipment. The term motorized refers to a vehicle that can move under power provided by an electric motor or an internal combustion engine.

Window: As used in this disclosure, a window is an opening in the body of a vehicle that is fitted with glass or other transparent material in a frame to admit light or air and that allows people to see out. Windshields and windscreens are explicitly considered to be windows in this definition.

Window Film: As used in this disclosure, window film is a thin film or laminate that is used as a coating to retrofit or upgrade the glass surfaces, or windows and windshields, of automobiles, boats, or other vehicles.

Windshield: As used in this disclosure, a windshield refers to the front window of a vehicle that is intended to shield the occupants of the vehicle from the wind generated by the normal forward motion of the vehicle.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:
1. A windshield protector comprising:
a protective sheeting and an adhesive;
wherein the windshield protector is adapted for use with a vehicle;
wherein the windshield protector is adapted for use with the windshield of the vehicle;
wherein the windshield protector is applied to the vehicle windshield;
wherein the windshield protector is adapted to protect the vehicle windshield from damage by deflecting road debris that contacts the vehicle windshield during travel;
wherein the windshield protector is texturized;
wherein the adhesive attaches the protective sheeting to the vehicle windshield;
wherein the protective sheeting comprises a film and a textured surface;
wherein the film is a plastic sheeting;
wherein the film is further defined with a first surface and a second surface;
wherein the textured surface is applied to the first surface;
wherein the film is formed from a polyimide;
wherein the textured surface comprises a plurality of hemispherical projections;
wherein each hemisphere selected from the plurality of hemispherical projections is a hemispherical structure that is positioned on the first surface such that the convex surface of each selected hemisphere is viewed when the first surface of the film is directly viewed;
wherein any hemisphere selected from the plurality of hemispherical projections is identical to the hemispheres remaining within the plurality of hemispherical projections;
wherein each hemisphere selected from the plurality of hemispherical projections is defined with a diameter;
wherein each hemisphere selected from the plurality of hemispherical projections is assigned to a first sub-plurality of hemispherical projections;
wherein each hemisphere selected from the plurality of hemispherical projections is further assigned to a second sub-plurality of hemispherical projections;
wherein each of the plurality of hemispherical projections is arranged on the first surface such that the spherical center of each hemisphere lies on the first surface;
wherein each of the plurality of hemispherical projections is arranged on the first surface such that the spherical center of any hemisphere selected from the first sub-plurality of hemispherical projections lies on a first line such that the first sub-plurality of hemispherical projections forms a row;
wherein each of the plurality of hemispherical projections is arranged on the first surface such that the spherical center of any hemisphere selected from the second sub-plurality of hemispherical projections lies on a second line such that the second sub-plurality of hemispherical projections forms a column;
wherein a first span spacing between the spherical centers of any two adjacent hemispheres selected from the first sub-plurality of hemispherical projections are equal;

wherein a second span spacing between the spherical centers of any two adjacent hemispheres selected from the second sub-plurality of hemispherical projections are equal;

wherein the first span spacing and the second span spacing are equal;

wherein the first span spacing equals twice the diameter of any hemisphere selected from the plurality of hemispherical projections;

wherein the second span spacing equals twice the diameter of any hemisphere selected from the plurality of hemispherical projections;

wherein the diameter of any hemisphere selected from the plurality of hemispherical projections is less than or equal to 0.1 mm;

wherein the protective sheeting further comprises a reinforced backing;

wherein the reinforced backing is a transparent structure applied to the second surface of the film.

2. The windshield protector according to claim 1 wherein the adhesive is a silicone based clear pressure sensitive adhesive.

3. The windshield protector according to claim 2 wherein the curing of the silicone based clear pressure sensitive adhesive is accelerated with UV light.

4. The windshield protector according to claim 3 wherein the film is tinted with a pigment.

5. The windshield protector according to claim 1 wherein the reinforced backing is formed from a plurality of graphene sheets;

wherein each individual graphene sheet selected from the plurality of graphene sheets is layered against the individual graphene sheets remaining in the plurality of graphene sheets to form a transparent substrate that is applied to the second surface of the film.

6. The windshield protector according to claim 5 wherein each individual graphene sheet is applied to the second surface of the film using a technique selected from the group consisting of a lithographic technique or a printing technique.

7. The windshield protector according to claim 6 wherein the adhesive is a silicone based clear pressure sensitive adhesive.

8. The windshield protector according to claim 7 wherein the curing of the silicone based clear pressure sensitive adhesive is accelerated with UV light.

9. The windshield protector according to claim 8 wherein the number of individual graphene sheets contained within the plurality of graphene sheets is less than forty six.

10. The windshield protector according to claim 9 wherein the number of individual graphene sheets contained within the plurality of graphene sheets is less than ten.

* * * * *